(12) United States Patent
Lin et al.

(10) Patent No.: US 12,369,702 B1
(45) Date of Patent: Jul. 29, 2025

(54) BEAUTY MASK WITH BUILT-IN VR GLASSES

(71) Applicant: Y.LIN ELECTRONICS CO., LTD., Guangdong (CN)

(72) Inventors: Qicheng Lin, Guangdong (CN); Guoliang Qiu, Miaoli County (TW); Huihuang Liu, Hunan (CN); Huiyan Zhong, Guangdong (CN); Yonghan Wu, Fujian (CN); Zhichao Ye, Guangdong (CN)

(73) Assignee: Y.LIN ELECTRONICS CO., LTD., Dongguan (CN)

( * ) Notice: Subject to any disclaimer, the term of this patent is extended or adjusted under 35 U.S.C. 154(b) by 0 days.

(21) Appl. No.: 19/019,561

(22) Filed: Jan. 14, 2025

(30) Foreign Application Priority Data

Jan. 3, 2025 (CN) .......................... 202510013375.X

(51) Int. Cl.
*A45D 44/00* (2006.01)
*G02B 27/01* (2006.01)

(52) U.S. Cl.
CPC ...... *A45D 44/002* (2013.01); *A45D 2200/205* (2013.01); *G02B 27/0176* (2013.01)

(58) Field of Classification Search
CPC .............. G02B 27/0176; A45D 44/002; A45D 2200/205
See application file for complete search history.

(56) References Cited

U.S. PATENT DOCUMENTS

| 2018/0267575 | A1* | 9/2018 | Sullivan | ................ G02B 26/02 |
| 2022/0326524 | A1* | 10/2022 | Peng | ................ G02B 27/0172 |
| 2025/0041622 | A1* | 2/2025 | Li | ........................ A61N 5/0616 |

* cited by examiner

*Primary Examiner* — Muhammad N Edun

(57) ABSTRACT

Disclosed is a beauty mask with built-in vr glasses. The beauty mask includes a mask and vr glasses, where an eye notch for mounting the vr glasses is formed in the mask, and a light shielding layer closely fitted to an edge of the eye notch by one circle is fixedly arranged on an inner side surface of the mask, to fit the periocular and block eyes from being illuminated; the mask is further provided with a nose-shaped cover that is fitted to a lower edge of the eye notch to support a bottom end of the vr glasses; and the mask is further provided with a plurality of first hanging rings located above the eye notch, each of the first hanging rings is provided with a tension rope for pulling the vr glasses so as to provide a tension force for a top end of the vr glasses.

9 Claims, 9 Drawing Sheets

BEAUTY MASK WITH BUILT-IN VR GLASSES

CROSS REFERENCE TO RELATED APPLICATIONS

The present application claims the benefit of Chinese Patent Application No. 202510013375.X filed on Jan. 3, 2025, the contents of which are incorporated herein by reference in their entirety.

TECHNICAL FIELD

The present disclosure relates to the technical field of beauty masks, and specifically relates to a beauty mask with built-in vr glasses.

BACKGROUND

A phototherapy through a beauty mask is effective in treating various skin disorders. When a phototherapy mask emits light, a user usually needs to separately use an eye mask, gauze, or a face towel to cover his/her eyes to block light. Moreover, during facial care, the user also needs to close his/her eyes, and feels bored to some extent, such that his/her experience of using the beauty mask is relatively poor.

Virtual reality (vr) technology integrates computer technology, electronic information technology and simulation technology, which is implemented basically by simulating a virtual environment through a computer to give people a sense of environmental immersion. With continuous development of social productivity and science and technology, the demand for vr technology across various industries is increasing.

Therefore, integrating vr glasses with a beauty mask can significantly reduce the above boredom caused by use of a beauty mask alone. The vr glasses have a certain thickness and a weight equal to or larger than that of the mask, such that higher requirements are raised for connection therebetween for combined use. During wearing of the beauty mask, it is necessary to ensure that the vr glasses remain firm and stable on the mask in a stationary or moving state. Therefore, a beauty mask with built-in vr glasses is provided.

SUMMARY

The present disclosure provides the following technical solution to achieve the above objective: a beauty mask with built-in vr glasses, including a mask and vr glasses, where an eye notch for mounting of the vr glasses is formed in the mask, and a light shielding layer closely fitted to an edge of the eye notch by one circle is fixedly arranged on an inner side surface of the mask, to fit the periocular and block eyes from being illuminated;

the mask is further provided with a nose-shaped cover that is fitted to a lower edge of the eye notch to support a bottom end of the vr glasses;

the mask is further provided with a plurality of first hanging rings located above the eye notch, and each of the first hanging rings is provided with a tension rope for pulling the vr glasses so as to provide a tension force for a top end of the vr glasses; and a fixing housing is fixedly arranged on either of two side surfaces of the vr glasses, a groove is formed on a surface of the fixing housing opposite to the mask, the mask is further provided with a second hanging ring opposite to the groove, a locking ring is movably mounted inside the groove, and the locking ring is snap-fitted into the second hanging ring to lock two sides of the vr glasses.

Preferably, a plurality of bayonets are arranged on a side end face of the light shielding layer plurality of snap-fit columns that are snap-fitted into the bayonets are arranged on a side end face of the vr glasses.

Preferably, the light shielding layer is made of a silica gel material, a cross-sectional shape of the light shielding layer is consistent with that of the vr glasses, and mating surfaces of the light shielding layer and the vr glasses are closely fitted with each other when the two are butt-jointed.

Preferably, outside of the nose-shaped cover protrudes toward an outer side of the mask, and inside of the nose-shaped cover is of a hollow structure and configured to accommodate noses.

Preferably, a plurality of hanging rope pieces for hanging the tension ropes are arranged at the top end of the vr glasses, the plurality of hanging rope pieces and the first hanging rings match in quantity and are spaced apart from each other at an interval respectively, and a gap between every two adjacent hanging rope pieces is smaller than a gap between every two adjacent first hanging rings.

Preferably, the fixing housing is provided with a screw rod extending into the groove in a threaded and penetrated manner, one end of the screw rod is axially connected to a hinge, and one end of the hinge is movably connected to a connecting plate.

Preferably, the other end of the connecting plate is fixedly connected to an outer surface of the locking ring, and both the hinge and the connecting plate are located inside the groove.

Preferably, a first strap is arranged on either side surface of the mask and configured for binding to a side surface of a user's head, and a second strap is arranged at a top end of the mask 1 for binding to a top end of the user's head.

Preferably, one end of the first strap is fixedly provided with a snap-fit head, one end of the second strap is in snap-in connection with a snap-fit housing, and a locking slot for embedding the snap-fit head is formed inside the snap-fit housing.

Beneficial Effects

Compared with the prior art, the present disclosure provides a beauty mask with built-in vr glasses, and has the following beneficial effects:

by arranging the vr glasses on the mask, the user can enjoy visual entertainment through the vr glasses during facial phototherapy care, and is more pleasant during facial care, which indirectly improves an effect of facial care to some extent;

by arranging the light shielding layer around an edge of the vr glasses by one circle, the present disclosure is capable of not only blocking light from a phototherapy mask, but also greatly reducing discomfort caused by use of gauze, an eye mask and any other thing for covering eyes;

by arranging tension members at the top end of, support members at the bottom of, and locking members on both sides of the vr glasses, the present disclosure ensures that the vr glasses are not easily loosened or detached when mounted on the mask for use, thereby ensuring an optimal experience of using the beauty mask for phototherapy; and for mounting of the vr glasses, the screw rod in the locking member is rotated to drive the locking ring to be tightened in the second hanging ring; for disassembling of the vr glasses, the hinge is rotated reversely to release the locking ring from the second hanging ring; and the vr glasses and the light shielding layer are connected in a way of inserting the snap-fit column into the bayonet in a penetrated manner, such that the vr glasses can be mounted and disassembled in an easier manner, thereby enhancing overall convenience of using the beauty mask.

BRIEF DESCRIPTION OF THE DRAWINGS

The accompanying drawings described herein are used for providing further understanding of present disclosure, and constitute part of the present disclosure. Illustrative examples and their descriptions of the present disclosure are intended to explain the present disclosure, but not constitute an undue limitation on the present disclosure. Reference numerals in the figures.

Figure 1:
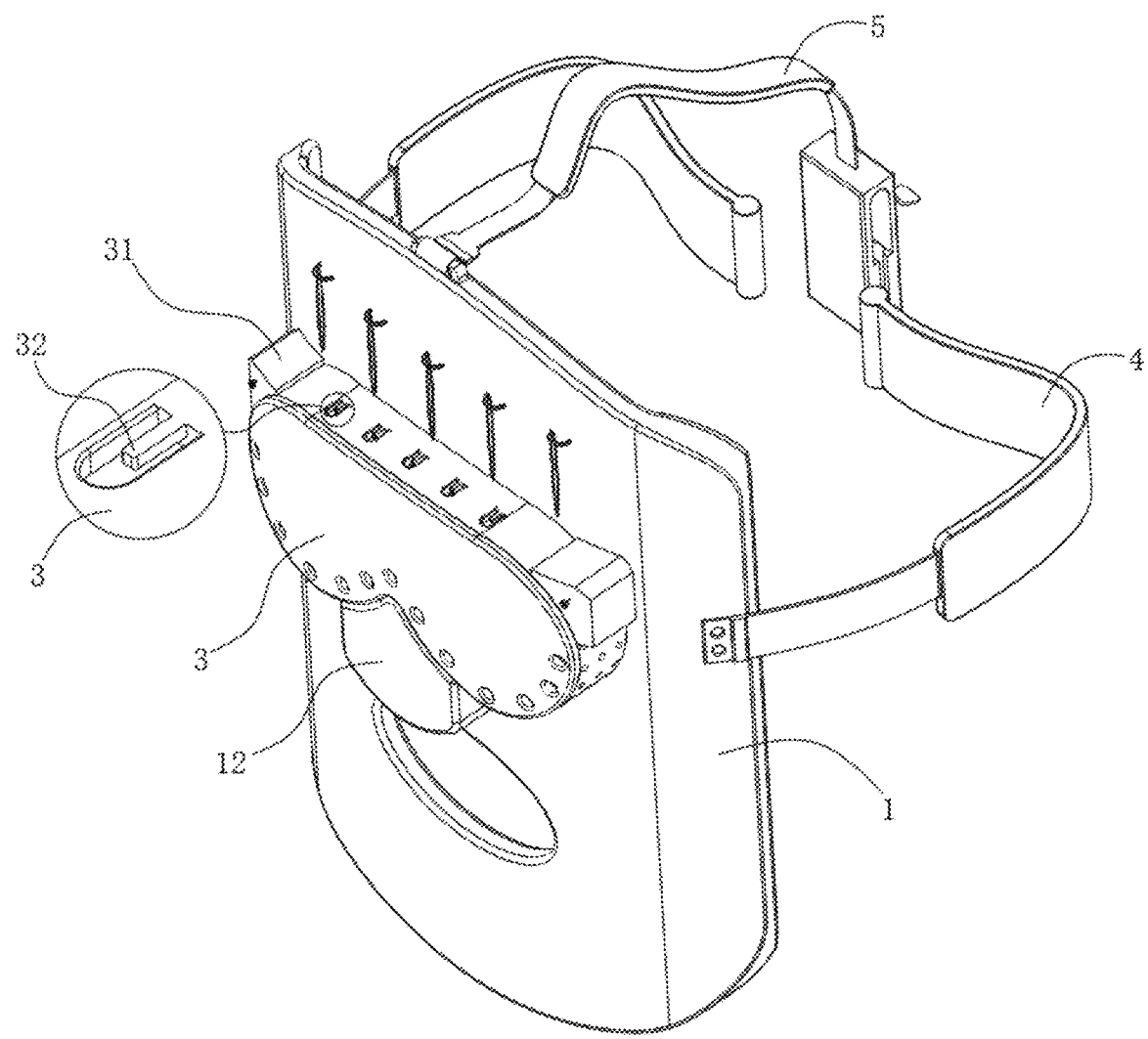
FIG. 1 is a structural schematic diagram of connection between a mask and vr glasses of the present disclosure.

Reference numerals in the figures:

1. mask; 11. eye notch; 12. nose-shaped cover; 13. first hanging ring; 131. tension rope; 14. second hanging ring; 2. light shielding layer; 21. bayonet; 3. vr glasses; 31. fixing housing; 311. groove; 312. screw rod; 313. hinge; 314. locking ring; 315. connecting plate; 32. hanging rope piece; 33. snap-fit column; 4. first strap; 41. snap-fit head; 5. second strap; 51. snap-fit housing; and 52. locking slot.

DETAILED DESCRIPTIONS OF THE EMBODIMENTS

The embodiments of the present disclosure will be described in detail below with reference to the accompanying drawings and examples, so as to fully understand and implement a process of applying technical means to solve technical problems and achieve technical effects in the present disclosure.

As illustrated in FIGS. 1-8, in an example of the present disclosure, the present disclosure provides the following technical solution to achieve the above objective: a beauty mask with built-in vr glasses, including a mask 1 and vr glasses 3, where an eye notch 11 for mounting of the vr glasses 3 is formed in the mask 1, and a light shielding layer 2 that tightly surrounds an edge of the eye notch 11 by one circle is fixedly arranged on an inner side surface of the mask 1, to fit the periocular and block eyes from being illuminated; and a plurality of bayonets 21 are arranged on a side end face of the light shielding layer 2, a plurality of snap-fit columns 33 that are snap-fitted into the bayonets 21 are arranged on a side end face of the vr glasses 3, the light shielding layer 2 is made of a silica gel material, a cross-sectional shape of the light shielding layer 2 is consistent with that of the vr glasses 3, mating surfaces of the light shielding layer 2 and the vr glasses 3 are closely fitted with each other when the two are butt-jointed, the plurality of snap-fit columns 33 are snap-fitted inside the bayonets 21 when the light shielding layer 2 and the vr glasses 3 are butt-jointed, and the two are connected simply to facilitate disassembly of the vr glasses 3.

Figure 4:
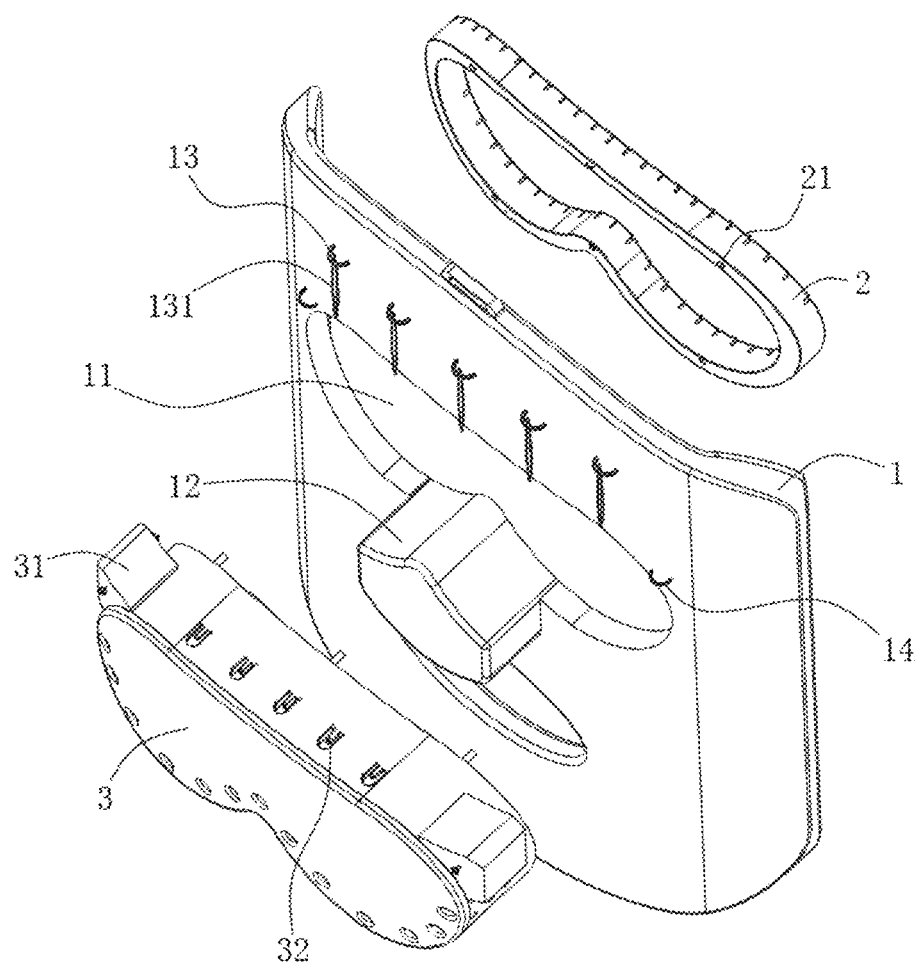
FIG. 4 is an exploded view of a mask, vr glasses, and a light shielding layer of the present disclosure.
Figure 9:
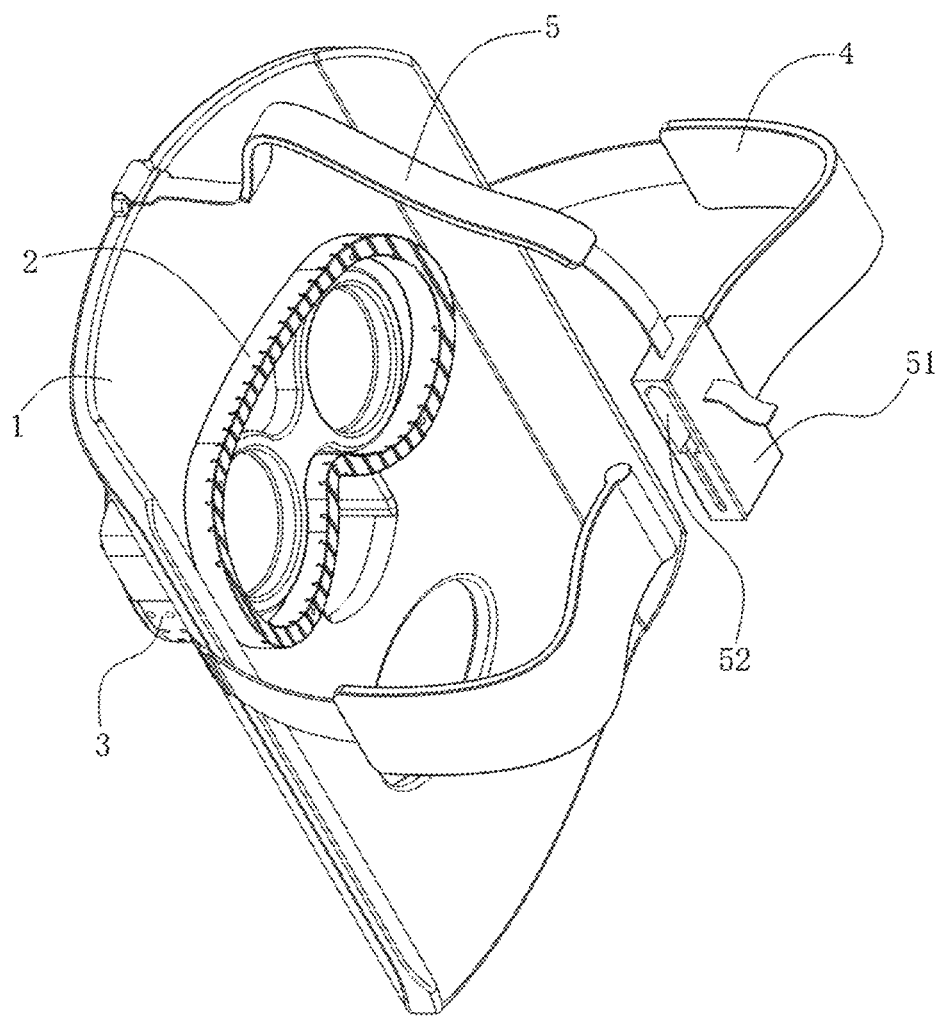
FIG. 9 is a structural diagram of connection between a mask, a first strap and a second strap of the present disclosure.

Further, as illustrated in FIGS. 1, 4 and 9, the mask 1 is further provided with a nose-shaped cover 12 that is fitted to a lower edge of the eye notch 11 to support a bottom end of the vr glasses 3, outside of the nose-shaped cover 12 protrudes toward an outer side of the mask 1, inside of the nose-shaped cover 12 is of a hollow structure and configured to accommodate noses, and arrangement of the nose-shaped cover 12 provides an upward support force for the vr glasses 3 to alleviate a downward gravity of the vr glasses 3 on the mask 1, which improves stability of connection between the vr glasses 3 and the mask 1 to some extent.

Further, as illustrated in FIG. 4, the mask 1 is further provided with a plurality of first hanging rings 13 located above the eye notch 11, each of the first hanging rings 13 is provided with a tension rope 131 for pulling the vr glasses 3 so as to provide a tension force for a top end of the vr glasses 3, and the tension rope 131 can be made of an elastic rubber ring material or any other non-elastic material, which mainly serves to pull the vr glasses 3 upward; and a plurality of hanging rope pieces 32 for hanging the tension ropes 131 are arranged at the top end of the vr glasses 3, the plurality of hanging rope pieces 32 and the first hanging rings 13 match in quantity and are spaced apart from each other at an interval respectively, a gap between every two adjacent hanging rope pieces 32 is smaller than a gap between every two adjacent first hanging rings 13, and different gaps enable that tension directions are dispersed outward after the tension ropes 131 are sleeved on the hanging rope pieces 32, such that a better effect of balancing the downward gravity of the vr glasses 3 is achieved.

Figure 5:
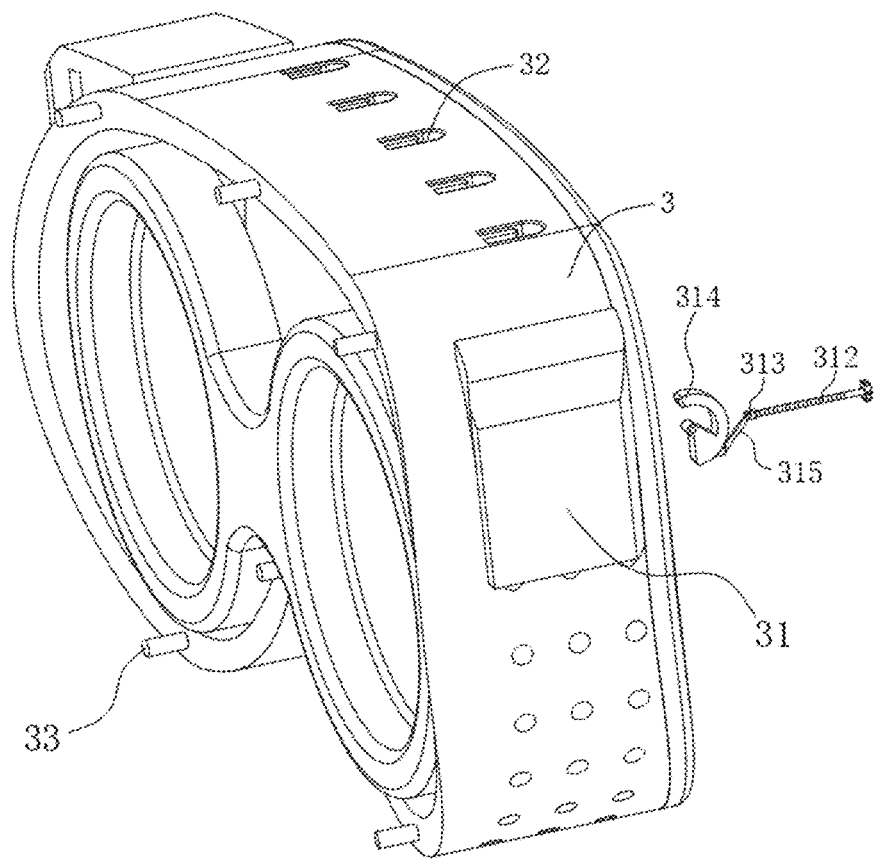
FIG. 5 is an exploded view of an internal structure of vr glasses and a fixing housing of the present disclosure
Figure 6:
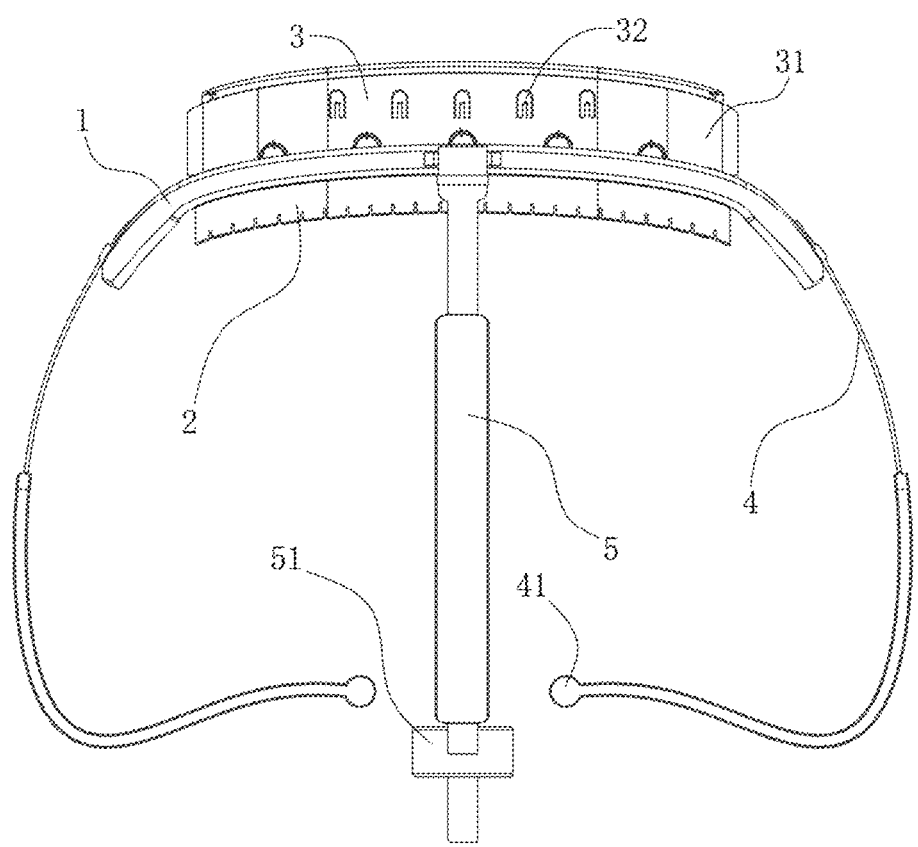
FIG. 6 is a top view of FIG. 1 of the present disclosure.
Figure 7:
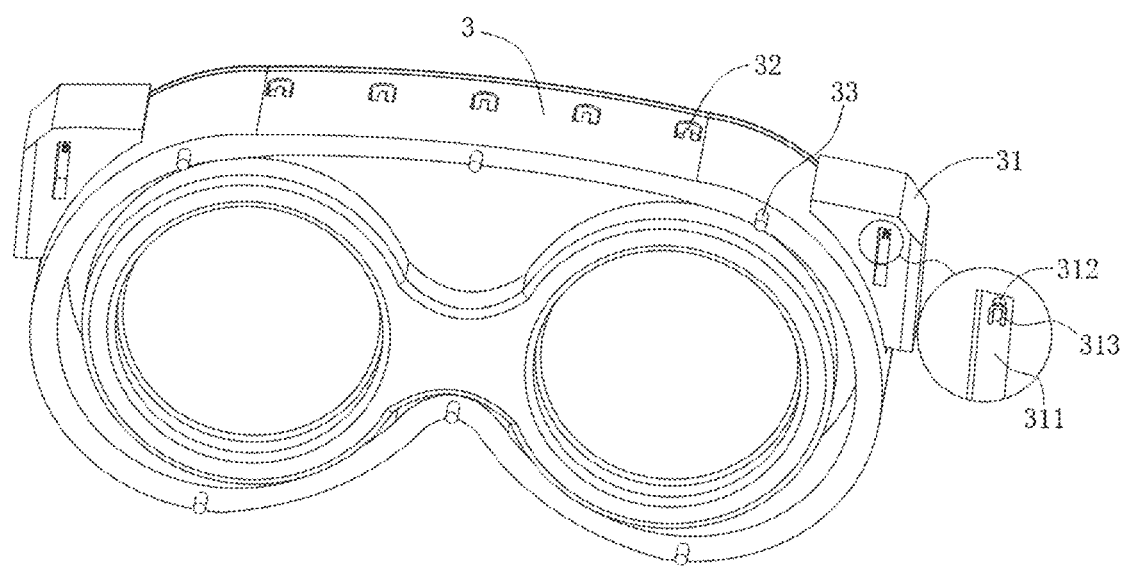
FIG. 7 is a structural diagram of vr glasses and one side of a fixing housing on a side surface thereof according to the present disclosure.
Figure 8:
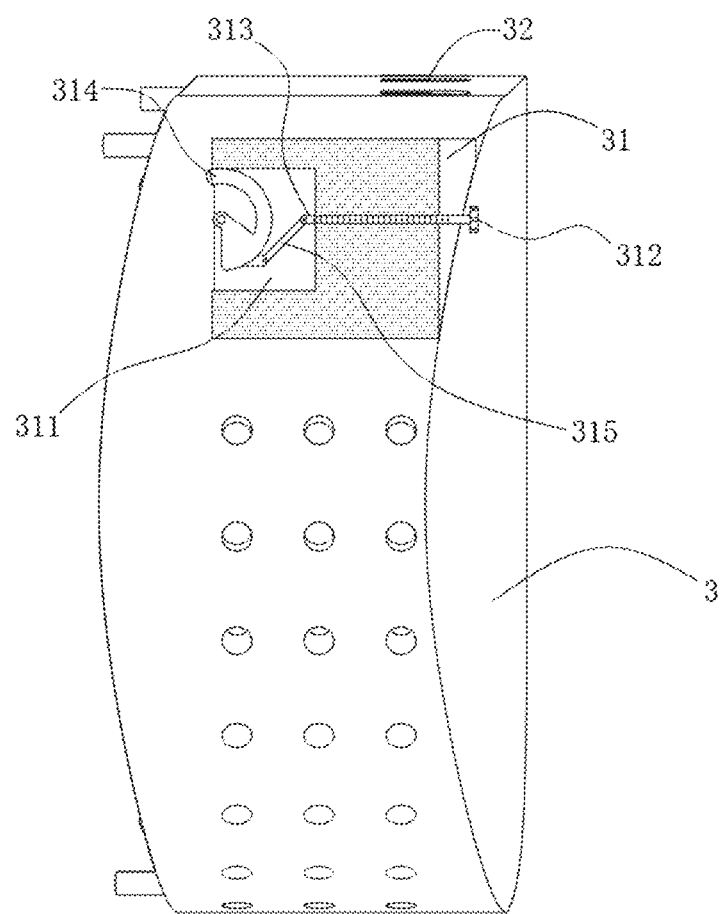
FIG. 8 is a sectional view of an internal structure of vr glasses and a fixing housing of the present disclosure.

As illustrated in FIGS. 5, 7 and 8, a fixing housing 31 is fixedly arranged on either of two side surfaces of the vr glasses 3, a groove 311 is formed on a surface of the fixing housing 31 opposite to the mask 1, the mask 1 is further provided with a second hanging ring 14 opposite to the groove 311, a locking ring 314 is movably mounted inside the groove 311, and the locking ring 314 is snap-fitted into the second hanging ring 14 to lock two sides of the vr glasses 3; and the fixing housing 31 is provided with a screw rod 312 extending into the groove 311 in a threaded and penetrated manner, one end of the screw rod 312 is axially connected to a hinge 313, one end of the hinge 313 is movably connected to a connecting plate 315, the other end of the connecting plate 315 is fixedly connected to an outer surface of the locking ring 314, and both the hinge 313 and the connecting plate 315 are located inside the groove 311; to mount the vr glasses 3, the vr glasses 3 and the light shielding layer 2 are butt-jointed first, then the snap-fit columns 33 are connected to the bayonets 21 in a penetrated manner, the screw rod 312 is rotated to move the vr glasses 3 through the connecting plate 315, the connecting plate 315 drives the locking ring 314 to rotate in situ with a central point thereof as a circle center, and in this case, the locking ring 314 rotates until being locked in the second hanging ring 14, such that locking of the vr glasses 3 on the mask 1 is completed; and to disassemble the vr glasses 3, the screw rod 312 is rotated reversely to drive the locking ring 314 to be removed from the second hanging ring 14.

Figure 2:
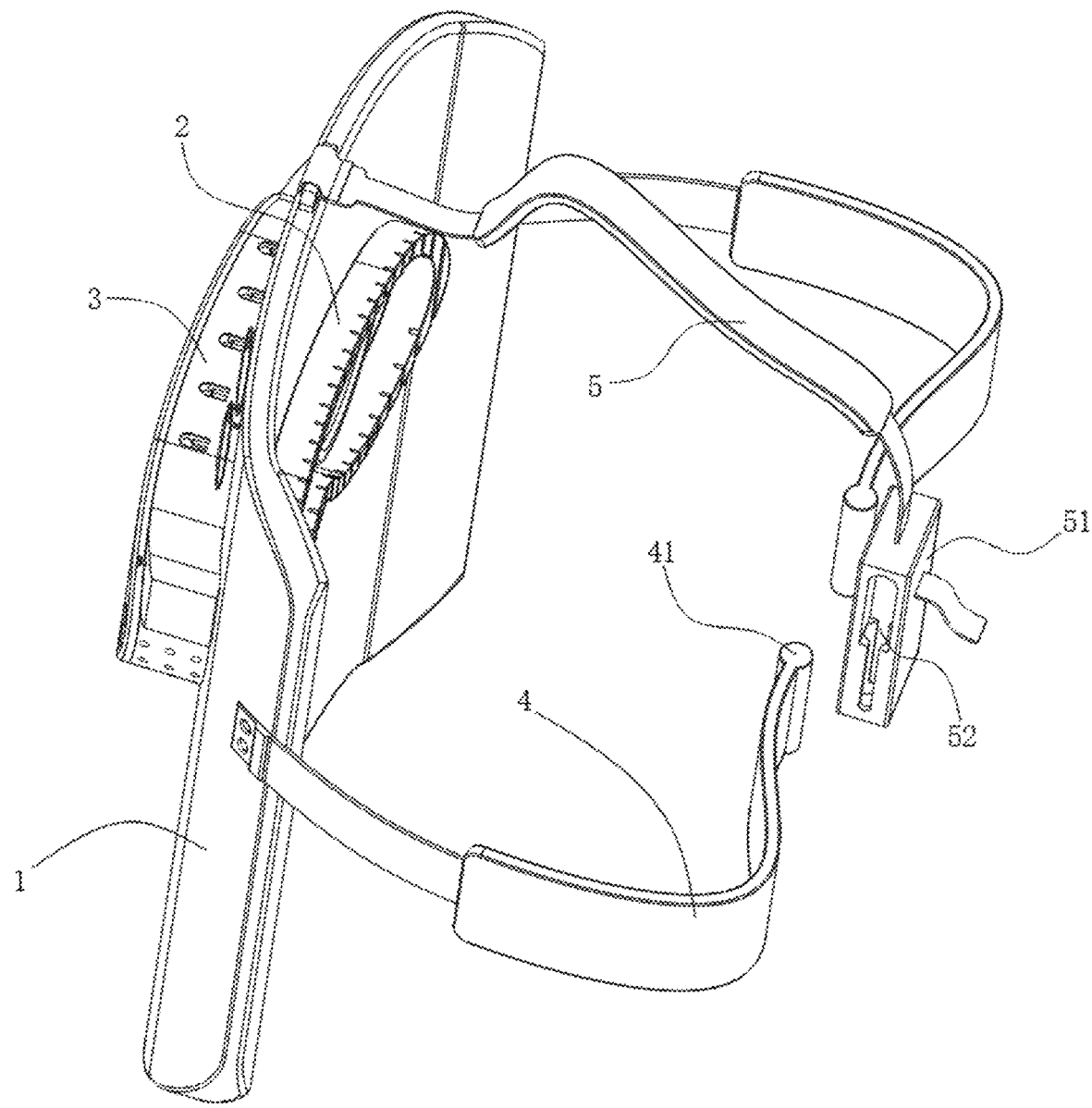
FIG. 2 is a structural schematic diagram of another view of a mask and vr glasses of the present disclosure.
Figure 3:
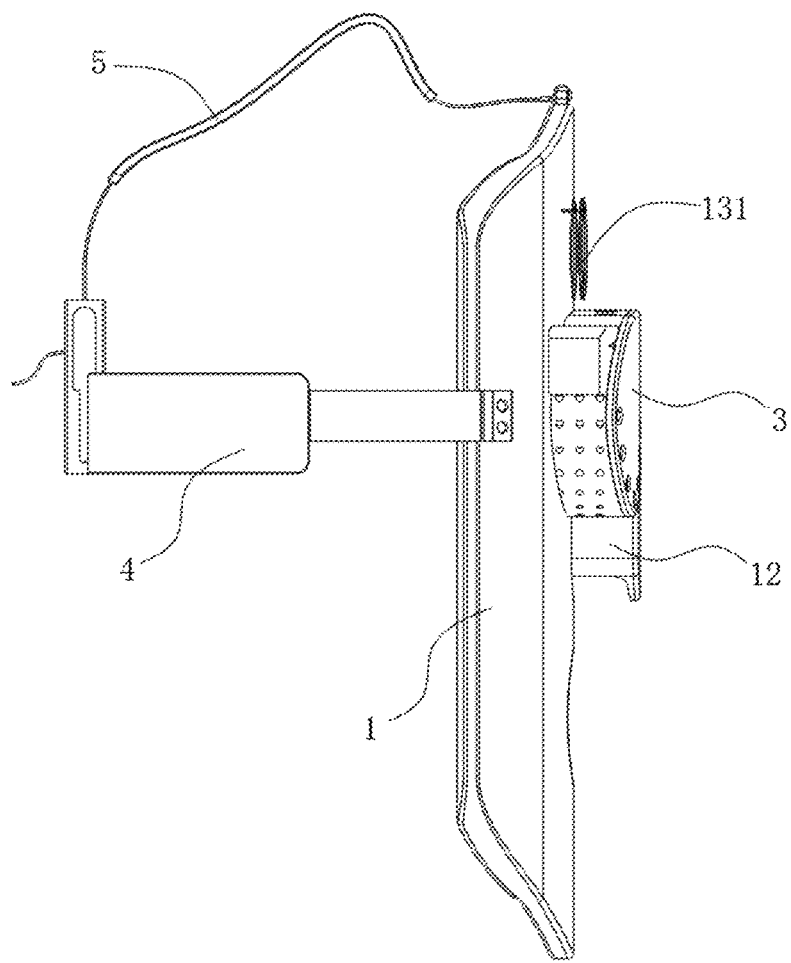
FIG. 3 is a side view of FIG. 1 of the present disclosure.

Further, as illustrated in FIGS. 2 and 9, a first strap 4 is arranged on either side surface of the mask 1 and configured for binding to a side surface of a user's head, a second strap 5 is arranged at a top end of the mask 1 for binding to a top end of the user's head, one end of the first strap 4 is fixedly provided with a snap-fit head 41, one end of the second strap 5 is in snap-in connection with a snap-fit housing 51, and a locking slot 52 for embedding the snap-fit head 41 is formed inside the snap-fit housing 51; the two first straps 4 are fitted to both sides of the user's head, the second strap 5 is fitted at a top of the user's head, and the snap-fit head 41 is inserted into the locking slot 52 in a penetrated manner to complete an overall connection between the first straps and the second strap, such that the mask 1 and the vr glasses 3 have higher stability as a whole due to binding and support by the first straps 4 and the second strap 5; and a length of the second strap 5 on the snap-fit housing 51 is adjusted to change tightness of wearing.

In the above example, to mount the vr glasses 3 on the mask 1, the vr glasses 3 and the light shielding layer 2 are butt-jointed first, then the snap-fit columns 33 are connected to the bayonets 21 in a penetrated manner, then the screw rod 312 is rotated to move the vr glasses 3 through the connecting plate 315, the connecting plate 315 drives the locking ring 314 to rotate in situ with a central point thereof as a circle center, and in this case, the locking ring 314 rotates until being locked in the second hanging ring 14, such that locking of the vr glasses 3 on the mask 1 is completed; to disassemble the vr glasses 3, the screw rod 312 is rotated reversely to drive the locking ring 314 to be removed from the second hanging ring 14; finally, the mask 1 is fitted to the user's face, the two first straps 4 are fitted to both sides of the user's head, the second strap 5 is fitted at a top of the user's head, and the snap-fit head 41 is inserted into the locking slot 52 in a penetrated manner; and a length of the second strap 5 on the snap-fit housing 51 is adjusted to complete the wearing.

It should be noted that lamp beads used in the beauty mask are capable of automatically adjusting light wavelengths according to settings during beauty treatment, and specifically, beauty effects of various wavelengths are as follows:

at a wavelength of 308 nm: repairing human skin, mucosal ulcers, and acne;
at a wavelength of 415 nm-480 nm: alleviating skin inflammation, reducing skin allergies, and treating acne;
at a wavelength of 532 nm: treating superficial skin spots such as freckles and age spots (seborrheic keratosis);
at a wavelength of 560 nm: soothing and relieving fatigue, and treating pachulosis;
at a wavelength of 585 nm-590 nm: enhancing lymphatic flow in a human body, inhibiting pigmentation, and whitening skin;
at a wavelength of 610 nm-670 nm: promoting blood circulation in the human body, accelerating wound healing, and improving skin texture and wrinkles;
at a wavelength of 808 nm and 810 nm: removing hair and treating skin diseases such as hairy nevus and pseudo-folliculitis;
at a wavelength of 830 nm: reducing human skin pigmentation, alleviating skin inflammation, and preventing scar formation;
at a wavelength of 850-970 nm: preventing or treating human wounds and scars;
at a wavelength of 980 nm: promoting formation of new blood vessels in the human body, enhancing collagen production, and eliminating inflammation;
at a wavelength of 1050 nm: reducing human skin laxity and wrinkles, and improving dilation of facial capillaries;
at a wavelength of 1064 nm: treating epidermal plaques, dermal melasma, and pigmentary diseases in dark-skinned individuals;
at a wavelength of 1450 nm: treating moderate to severe acne, folliculitis, sebaceous gland hyperplasia and the like in human skin; and
at a wavelength of 1535 nm and 1550 nm: achieving wrinkle removal and rejuvenation of human skin, and treating depressed scars.

Moreover, the vr glasses in this solution have various functions, including but not limited to movie watching and gaming.

Although the examples of the present disclosure have been illustrated and described, it should be understood that those of ordinary skill in the art may make various changes, modifications, replacements and variations to the above examples without departing from the principle and spirit of the present disclosure, and the scope of the present disclosure is limited by the appended claims and their legal equivalents.

What is claimed is:

1. A beauty mask with built-in vr glasses, comprising a mask and vr glasses, wherein an eye notch for mounting the vr glasses is formed in the mask, and a light shielding layer closely fitted to an edge of the eye notch by one circle is fixedly arranged on an inner side surface of the mask, to fit the periocular and block eyes from being illuminated;

the mask is further provided with a nose-shaped cover that is fitted to a lower edge of the eye notch to support a bottom end of the vr glasses;

the mask is further provided with a plurality of first hanging rings located above the eye notch, and each of the first hanging rings is provided with a tension rope for pulling the vr glasses so as to provide a tension force for a top end of the vr glasses; and a fixing housing is fixedly arranged on either of two side surfaces of the vr glasses, a groove is formed on a surface of the fixing housing opposite to the mask, the mask is further provided with a second hanging ring opposite to the groove, a locking ring is movably mounted inside the groove, and the locking ring is snap-fitted into the second hanging ring to lock two sides of the vr glasses.

2. The beauty mask with built-in vr glasses according to claim 1, a plurality of bayonets are arranged on a side end face of the light shielding layer, and a plurality of snap-fit columns that are snap-fitted into the bayonets are arranged on a side end face of the vr glasses.

3. The beauty mask with built-in vr glasses according to claim 1, wherein the light shielding layer is made of a silica gel material, a cross-sectional shape of the light shielding layer is consistent with that of the vr glasses, and mating surfaces of the light shielding layer and the vr glasses are closely fitted with each other when the two are butt-jointed.

4. The beauty mask with built-in vr glasses according to claim 1, wherein outside of the nose-shaped cover protrudes toward an outer side of the mask, and inside of the nose-shaped cover is of a hollow structure and configured to accommodate noses.

5. The beauty mask with built-in vr glasses according to claim 1, wherein a plurality of hanging rope pieces for hanging the tension ropes are arranged at the top end of the vr glasses, the plurality of hanging rope pieces and the first hanging rings match in quantity and are spaced apart from each other at an interval respectively, and a gap between every two adjacent hanging rope pieces is smaller than a gap between every two adjacent first hanging rings.

6. The beauty mask with built-in vr glasses according to claim 1, wherein the fixing housing is provided with a screw rod extending into the groove in a threaded and penetrated manner, one end of the screw rod is axially connected to a hinge, and one end of the hinge is movably connected to a connecting plate.

7. The beauty mask with built-in vr glasses according to claim 6, wherein the other end of the connecting plate is fixedly connected to an outer surface of the locking ring, and both the hinge and the connecting plate are located inside the groove.

8. The beauty mask with built-in vr glasses according to claim 1, wherein a first strap is arranged on either side surface of the mask and configured for binding to a side surface of a user's head, and a second strap is arranged at a top end of the mask 1 for binding to a top end of the user's head.

9. The beauty mask with built-in vr glasses according to claim 8, wherein one end of the first strap is fixedly provided with a snap-fit head, one end of the second strap is in snap-in connection with a snap-fit housing, and a locking slot for embedding the snap-fit head is formed inside the snap-fit housing.

* * * * *